(12) United States Patent
Barlag

(10) Patent No.: US 10,124,541 B2
(45) Date of Patent: Nov. 13, 2018

(54) SETUP DEVICE AND METHOD FOR MANUFACTURING A FUSELAGE BARREL FOR AN AIRCRAFT

(71) Applicant: Airbus Operations GmbH, Hamburg (DE)

(72) Inventor: Carsten Barlag, Jever (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 235 days.

(21) Appl. No.: 13/960,167

(22) Filed: Aug. 6, 2013

(65) Prior Publication Data

US 2014/0008015 A1 Jan. 9, 2014

Related U.S. Application Data

(63) Continuation of application No. PCT/EP2012/052056, filed on Feb. 7, 2012.

(Continued)

(30) Foreign Application Priority Data

Feb. 7, 2011 (DE) .................. 10 2011 010 539

(51) Int. Cl.
*B29C 70/28* (2006.01)
*B29C 33/00* (2006.01)
(Continued)

(52) U.S. Cl.
CPC .......... *B29C 70/28* (2013.01); *B29C 33/0011* (2013.01); *B29C 33/307* (2013.01);
(Continued)

(58) Field of Classification Search
CPC .......... B29L 2031/3082; Y02T 50/433; Y02T 50/43; B64C 1/068; B64C 2001/0072;
(Continued)

(56) References Cited

U.S. PATENT DOCUMENTS

| 4,633,632 A | * | 1/1987 | Sarh ................ B21J 15/142 |
| | | | 52/245 |
| 7,503,368 B2 | | 3/2009 | Chapman et al. |

(Continued)

FOREIGN PATENT DOCUMENTS

| CA | 2487738 A1 | 5/2006 |
| DE | 103 31 358 A1 | 2/2004 |

(Continued)

OTHER PUBLICATIONS

German Patent Office, German Office Action for Application No. 10 2011 010 539.5 dated Feb. 27, 2013.

(Continued)

*Primary Examiner* — Michael N Orlando
*Assistant Examiner* — Cynthia L Schaller
(74) *Attorney, Agent, or Firm* — Lorenz & Kopf LLP

(57) ABSTRACT

A setup device for manufacturing a fuselage barrel, made of a fiber composite material, for an aircraft is provided. The setup device for the purpose of reinforcement includes several stringers arranged so as to be spaced apart from each other. The stringers include a base structure to form a load-bearing rigid substructure that is connected to an outwardly curved supporting surface that can be adjusted by means of actuators for the positive setup of the fuselage barrel to be manufactured with the help of form channels for accommodating the stringers. The actuators, designed as pressure-means cylinders, move one or several form channels in radial direction. The form channels are interconnected longitudinally by means of a flexible intermediate element for forming a ring-shaped supporting surface that is closed in a vacuum-tight manner and that overall is able to adjust itself in radial direction.

9 Claims, 4 Drawing Sheets

Related U.S. Application Data

(60) Provisional application No. 61/440,126, filed on Feb. 7, 2011.

(51) Int. Cl.
| | |
|---|---|
| *B29C 33/30* | (2006.01) |
| *B29C 33/48* | (2006.01) |
| *B29C 70/44* | (2006.01) |
| *B29D 99/00* | (2010.01) |
| *B64C 1/06* | (2006.01) |
| *B29L 31/30* | (2006.01) |
| *B64C 1/00* | (2006.01) |

(52) U.S. Cl.
CPC .......... *B29C 33/485* (2013.01); *B29C 70/443* (2013.01); *B29D 99/0017* (2013.01); *B64C 1/068* (2013.01); *B29L 2031/3082* (2013.01); *B64C 2001/0072* (2013.01); *Y02T 50/43* (2013.01)

(58) Field of Classification Search
CPC ... B29C 70/443; B29C 33/307; B29C 33/485; B29C 99/0017; B29C 70/28; B29C 33/0011; B29D 99/0014; B29D 99/0017
USPC ............. 156/60, 285, 382, 494, 64; 244/119
See application file for complete search history.

(56) References Cited

U.S. PATENT DOCUMENTS

| | | | |
|---|---|---|---|
| 7,597,772 B2 | 10/2009 | Martinez Cerezo et al. | |
| 2008/0196825 A1* | 8/2008 | Hamlyn | ................ B29C 70/382 156/232 |
| 2013/0000815 A1* | 1/2013 | Barlag | .................. B29C 33/485 156/64 |

FOREIGN PATENT DOCUMENTS

| | | |
|---|---|---|
| WO | 2007148301 A2 | 12/2007 |
| WO | WO 2007148301 A3 * | 3/2008 ........... B29C 33/485 |

OTHER PUBLICATIONS

International Searching Authority, International Search Report dated May 9, 2012 for International Patent Application No. PCT/EP2012/052056.

* cited by examiner

SETUP DEVICE AND METHOD FOR MANUFACTURING A FUSELAGE BARREL FOR AN AIRCRAFT

CROSS-REFERENCE TO RELATED APPLICATIONS

This is a continuation of International Application No PCT/EP2012/052056, filed. Feb. 7, 2012, which application claims priority to German Application No 10 2011 010 5395, filed. Feb. 7, 2011, and to U.S. Provisional Patent Application No 61/440,126, filed. Feb. 7, 2011, which are each incorporated herein by reference in their entirety.

TECHNICAL. FIELD

The technical field relates to a setup device for manufacturing a fuselage barrel, made of a fiber composite material, for an aircraft, which setup device for the purpose of reinforcement comprises several stringers arranged so as to be spaced apart from each other, comprising a base structure to form a load-bearing rigid substructure that is connected to an outwardly curved supporting surface that can be adjusted by means of actuators for setting up the fuselage barrel to be manufactured with the help of form channels for accommodating the stringers. Furthermore, the technical field also relates to a method for manufacturing a fuselage barrel with the use of such a setup device (AVR) which in the manufacturing process interacts with a laminating-bonding device (LKV).

The technical field predominantly extends to aircraft engineering. In particular, wide-bodied commercial aircraft or transport aircraft are usually manufactured in shell construction, in particular in half-shell construction. When joined, two half shells result in an almost circular or oval cross section of a fuselage section. Apart from this it is, however, also possible to manufacture single-piece fuselage barrels as a fuselage section In this process there is no joining of individual shells to form a fuselage section. The technical field deals specifically with the manufacture of such fuselage barrels.

BACKGROUND

DE 10 331 358 A1 shows a setup device for the manufacture of fuselage shells for an aircraft, which fuselage shells comprise fiber composite materials. In order to increase the strength of the fuselage shell the latter comprises stringers that extend so as to be spaced apart from each other. On a plane base carrier a grid of several supporting walls of different lengths are attached in such a manner that the ends of said supporting walls form a semicircle, wherein said supporting walls are arranged at angles to the base carrier, which angles are predetermined by the radius of the semicircle. At the distal ends of the supporting walls, which distal ends form the semicircle, modular profiles are attached that cover the interspaces between the supporting walls, with the outer surface of said profiles corresponding to the negative shape of the inner contour of the integral structural component to be manufactured. The grid of the supporting walls and the partition of the modular profiles are designed in such a manner that the gap of the modular profiles is in each case arranged underneath the position of a stringer. After preparation of the complete structure of the component and of the auxiliary materials, a suitable laminating-bonding device is placed in a precisely fitting manner above this assembly carrier, and the circumferential sealing compound that has previously been applied to the vacuum film or foil is compressed in such a manner that a vacuum-tight seal arises between the vacuum skin and the laminating-bonding device. Subsequently, the layer structure is evacuated on the side of the laminating-bonding device.

The fuselage shell comprising the stringers is made with the previously described setup device in that at first the outer surfaces of the modular profiles are covered by means of a loosely resting film or foil. Subsequently, the hollow space formed by the interspaces between the profiles is evacuated so that the film or foil is aspirated and is drawn into the profile grooves of the indentations in a form-fitting manner. After this, auxiliary materials can be placed onto the deep-drawn vacuum film or foil. Thereafter, stringer profiles embedded in supporting elements are placed into the profile grooves covered by the vacuum film or foil.

Positioning the stringer takes place by way of the matching geometries of the shaped parts that form the depression and the supporting elements. Depending on the manufacturing process, all the skin layers comprising fiber composite materials are placed, individually or as a packet, onto the outer surfaces of the modular profiles of the assembly carrier, which outer surfaces are covered by the vacuum film or foil, and onto the stringer profiles. Subsequently an optimized quantity of a sealing compound is applied to the vacuum film or foil. By precisely-fitting moving together the structure prepared in this manner onto the setup device with the laminating-bonding device the circumferential sealing compound is compressed in such a manner that a vacuum-tight seal between said vacuum film or foil and the laminating-bonding device arises. In order to accomplish the transfer of the complete construct from the setup device to the laminating-bonding device, the side of an additional setup device is vented and subsequently a vacuum is drawn on the side of the laminating-bonding device. As a result of this the entire construct is pressed at atmospheric pressure against the laminating-bonding device, and, finally, both devices are moved apart and the laminating-bonding device is rotated in order to then deliver the shell component manufactured in this manner to a curing process.

However, in the case of substantial opening angles of large fuselage shells this manufacturing method is associated with problems. Because of the substantial opening angles, the auxiliary materials and the stringer base areas during movement into the laminating-bonding device can rub against the outer positions of the sticking wet skin located therein, and consequently the form surface needs to be designed so as to be slightly smaller. To prevent the stringer and the auxiliary materials from bridging the required gap in an uncontrolled manner during transfer within the laminating-bonding device, and to prevent the former with the turned up vacuum film or foil from being simply taken along, a defined approach movement of the stringers and of the auxiliary materials is necessary.

Depending on the design of the stiffening elements in longitudinal direction (stringers), which can, for example, be designed as Ω-stringers or T-stringers, an undercut occurs that impedes the setup device and the laminating-bonding device from moving apart from each other. While the cavities for receiving the stringers on the setup device can be cut free in such a manner that moving apart is ensured, this results, however, in fixation of the auxiliary materials as a further problem in the case of substantial opening angles. Said auxiliary materials are usually placed onto, and affixed to, the free region between the stringer cavities If the stringer cavity is then substantially cut free, there remains hardly any room for exact positioning of the auxiliary materials.

While all these problems relating to manufacturing techniques occur in the manufacture of fuselage shells by means of the ARV and the laminating-bonding device, they analogously also exist during the manufacture of closed fuselage barrels. Since the above-described setup device/laminating-bonding device, which devices can be moved apart, cannot be used in the manufacture of closed fuselage barrels, special setup devices exist for this purpose in the state of the art.

In EP 2 062 814 A1 such a special setup device for the manufacture of closed fuselage barrels is disclosed. The special setup device essentially comprises a star-shaped base structure whose ends in each case are designed as form channels to accommodate stringers, thus forming part of the supporting surface for the setup process. The remaining part of the supporting surface is formed by radially-adjustable shaped pieces in which several form channels, situated side by side, are designed for receiving stringers. These radially movable shaped pieces are in each case arranged between two adjacent rigid end pieces of the base structure; they are moved by means of an air cushion, arranged between the base structure and the inside of the shaped pieces, opposite the form channels, in each case between a retracted position and an extended position. In the extended position of the shaped pieces, in cooperation with the rigid end pieces, the closed supporting surface for the positive setup of the fuselage barrel to be manufactured is formed.

For manufacturing the fuselage barrel, the supporting surface, which comprises stringers and any further extension elements, is subsequently wrapped in a tape comprising composite material. Subsequently an outer membrane is placed onto the wrapping layer, and the fuselage barrel is cured in the conventional manner with the use of pressure and temperature. Thus in this method-related step the setup device also carries out the function of a laminating-bonding device.

After curing, the device is to be removed from the fuselage barrel, for which purpose the radially-adjustable shaped pieces are transferred to their retracted position after ventilation of the air cushion. However, pulling the device from the fuselage barrel is impeded by the rigid end pieces of the base structure.

Other objects, desirable features and characteristics will become apparent from the subsequent summary and detailed description, and the appended claims, taken in conjunction with the accompanying drawings and this background.

SUMMARY

Increasingly, fiber composite materials, for example glass-fiber-reinforced or carbon-fiber-reinforced plastics are used in the manufacture of aircraft fuselages. In order to stiffen the aircraft fuselage and in order to make it possible for the latter to absorb the loads encountered, stiffening elements are used, for example T-stringers or Ω-stringers. These stringers extend so as to be spaced apart from each other on the inside along the aircraft fuselage. The stringers are combined with essentially ring-shaped frame elements that extend transversely to the aforesaid, which frame elements after manufacture of the fuselage section during assembly of the aircraft fuselage are attached on the inside. As part of the assembly of the aircraft fuselage several fuselage sections, for the tail section, the fuselage center, and the cockpit section, are joined.

The manufacture of a fuselage shell most of the time takes place with the use of a setup device. In this arrangement the setup device first receives stringers, and if applicable further installation elements on the fuselage inside, and subsequently fiber material and resin are applied. Curing of the fuselage component takes place subsequently after transfer in the laminating-bonding device which imparts the desired external contour to the fuselage component. After removal from the form, often subsequent machining takes place before assembly of the thus modeled fuselage components can be carried out in the manner described above.

Accordingly, provided is a setup device and a method for manufacturing a closed fuselage barrel, made of a fiber composite material, for an aircraft, which device and method allows time-efficient series production of closed fuselage barrels made of fiber composite materials while ensuring easy form removal.

The present disclosure encompasses the technical teaching according to which the actuators, designed as pressure-means cylinders, move one or several form channels in radial direction, which form channels are interconnected longitudinally by means of a flexible intermediate element for forming a ring-shaped supporting surface that is closed in a vacuum-tight manner and that overall is able to adjust itself in radial direction.

The solution according to the present disclosure provides, in particular, an advantage in that the supporting surface itself can overall be reduced in diameter so that easy removal of the form from the surrounding tubular laminating-bonding device can be achieved by simple movement, on the face, of the setup device from the tubular laminating-bonding device. Apart from this it is, however, also imaginable for the laminating-bonding device to be divided, for example comprising several shell components, in particular in order to support the form removal process in the case of three-dimensionally curved fuselage components; however, this requires a laminating-bonding device which is correspondingly more expensive from the point of view device technology. The solution according to the present disclosure makes it possible to create a ring-shaped supporting surface which overall is adjustable in radial direction, without this resulting in problems relating to tight sealing. Tightness of the supporting surface is necessary because of the manufacturing steps operating with a vacuum. To this effect in the solution according to the present disclosure the rigid form channels are in an alternating manner combined to receive the stringers with flexible intermediate elements.

According to one exemplary embodiment, it is proposed that such a flexible intermediate element be designed as an elastic band. In this way the required flexibility in radial direction and the tightness of the supporting surface can be achieved in a simple manner. For example a fiber-reinforced rubber band is suitable as an elastic band.

According to one of various aspects of the present disclosure, it is proposed that several rigidly interconnected form channels be adjusted by way of a shared actuator; because it is not absolutely necessary for a dedicated actuator or a series of actuators to be associated with each form channel. In this manner the number of actuators required can be minimized, as can the valve components and control components that control said actuators.

According to another exemplary embodiment, it is proposed that the groove base of the form channel comprise vacuum connections for the supporting surface. The supporting surface is designed so as to be vacuum-tight, and by means of the vacuum connections and distribution systems connected to them, as required, boreholes or grooves/channels for guiding the vacuum can be generated.

According to one embodiment, it is proposed that the cavity region of the form channel comprise several positioning sections that are arranged so as to be spaced apart from each other, that reduce the cavity cross section, and that correspond to the target position of the stringers to be placed in this location. Instead of the positioning section, thus the cross section of the form channel is reduced, generally by some millimeters, to the target external dimension of the stringer to be placed in this location. At this position the stringer is then guided in a simple manner and is accurately positioned. In addition, in the region of the positioning sections it is also possible to affix, in one example, on the rear, magnets for fixing the stringers or the like.

For improved handling of the setup device during the manufacturing process it is furthermore proposed for the base structure of the setup device to be installed on a travelling trolley for retraction and extension, on the face end, of the entire barrel-shaped setup device into a rigid-wall tubular laminating-bonding device.

In order to manufacture the fuselage barrel for an aircraft by means of a device as described above, the following method is provided according to one exemplary embodiment:
a) extending the actuators to form a supporting surface in the transfer position, which supporting surface corresponds to the initial position;
b) installing and sealing a vacuum film or foil on the supporting surface;
c) bonding prefabricated auxiliary-material webs into the regions between cavities/depressions of adjacent form channels;
d) placing stringers into the form channels;
e) moving the actuators back in order to form a retracted position for spaced-apart positioning of the overlaid supporting surface within an associated tubular laminating bonding setup device (LKV);
f) moving the entire overlaid setup device (ARV) on the face side into the tubular laminating bonding setup device (LKV);
g) extending the actuators to the transfer position for pressing the overlaid supporting surface onto a correspondingly formed counter-surface of the laminating bonding setup device (LKV);
h) undoing the evacuation on the side of the supporting surface, and starting the evacuation on the side of the laminating bonding setup device (LKV) for transferring the construct previously applied to the supporting surface; and
i) retracting the actuators to the retracted position for longitudinally-directed moving apart the setup device and the laminating-bonding device.

Finally, it is proposed, in the context of an additional intermediate step that follows on from putting into place the stringers in the form channels to put into place end pieces comprising sealant in the ends of the form channels. In this way in a simple manner at this location a continuous depression is filled in Thus on the face there is again a smooth surface created for connecting the sealing tape to the laminating-bonding device After the build-up of a vacuum for the fuselage barrel has been prepared in the manner according to the present disclosure, curing and thus bonding of the outer skin and stringers can take place in the conventional manner in an autoclave.

After curing, the auxiliary materials and the vacuum film or foil are removed, and the fuselage barrel is taken from the laminating-bonding device. In one example, immediately thereafter, the fuselage barrel manufactured in this manner should be subjected to mechanical processing and quality control, so that subsequently assembly to form a finished aircraft fuselage can be carried out.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
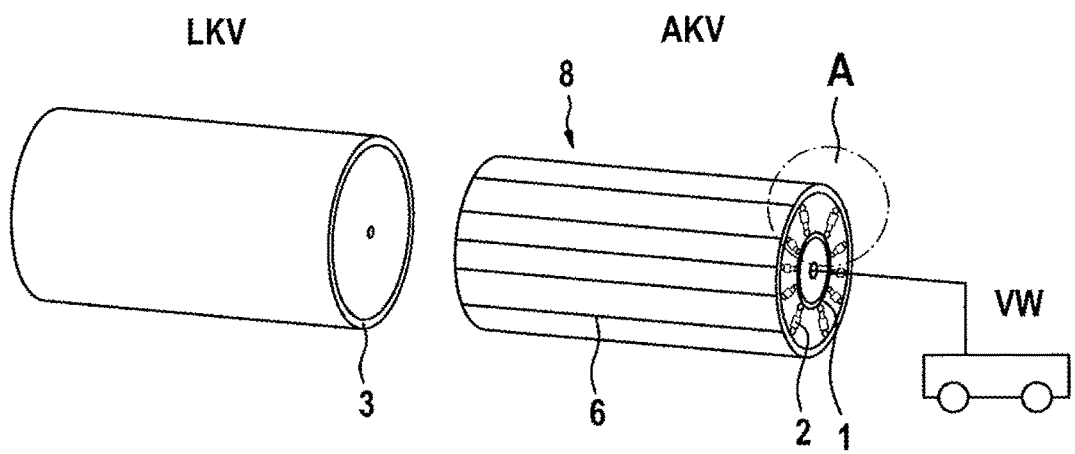
FIG. 1 is a diagrammatic view of a setup device for manufacturing fuselage barrels in conjunction with a laminating-bonding device.

According to FIG. 1 a setup device (AKV) of a barrel-shaped design essentially comprises a central base structure 1 to create a load-bearing rigid substructure from which in a star-shape several actuators 2 designed as pressure-means cylinders extend radially outwards. On the distal end of each actuator 2 one or several form channels 6 (for example) are attached which jointly form a radially-adjustable supporting surface 8 for the positive setup of the fuselage barrel to be manufactured.

On the face end the setup device (AKV) can be retracted and extended in a laminating-bonding device (LKV) with a closed form ring 3, for which purpose a travelling trolley (VW) is provided.

Figure 2:
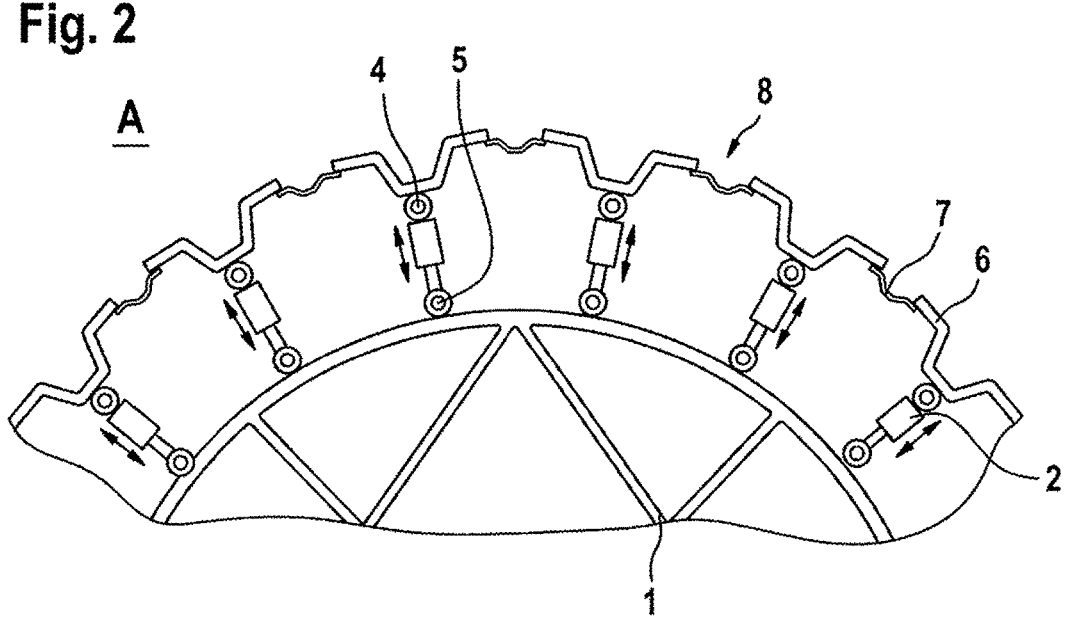
FIG. 2 is a cross-sectional detail in the region. A of the setup device shown in FIG. 1.

According to FIG. 2, a setup device in detail comprises the centrally arranged base structure 1 with the radially outwards extending actuators 2 which on the side of the base structure 1 by way of lower joints/elongated holes 5 and towards the distal end by way of lower joints/elongated holes 4 are connected to the form channels 6 for receiving stringers (not shown in further detail) of the fuselage barrel. The individual form channels 6 are interconnected by means of flexible/elastic intermediate elements 7 in such a manner that overall a vacuum-tight closed supporting surface 8 forms. In this exemplary embodiment the flexible intermediate elements 7 are designed as elastic bands.

Figure 3:
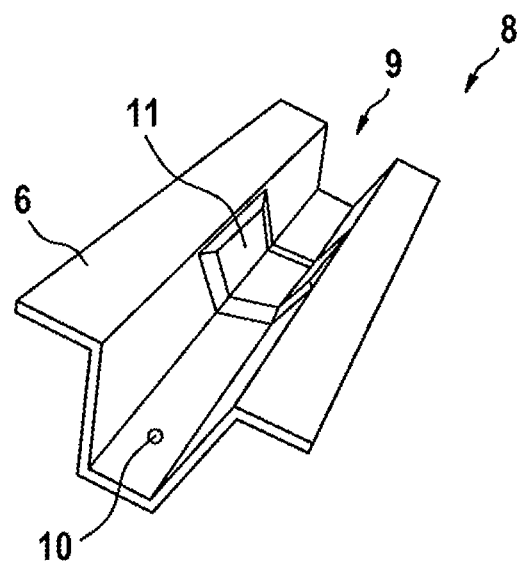
FIG. 3 is a perspective view of an exemplary form channel with integrated positioning means.

According to FIG. 3 the form channel 6, which in this embodiment is made from metal, of the device comprises vacuum connections 10 by way of which the supporting surface 8 can be evacuated. The groove area of the form channel 6 furthermore comprises a positioning section 11 that reduces the groove cross section 9, against which positioning section 11 during manufacture a stringer comes to rest in order to precisely align said form channel 6 within the device In the sequence of the following. FIGS. 4A to 4H an exemplary manufacturing sequence for a fuselage barrel are illustrated based on the exemplary device described above in FIG. 1

Figure 4A:
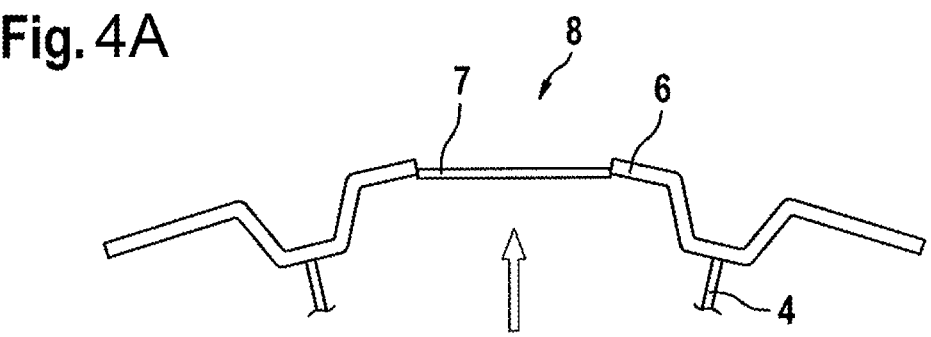
FIGS 4A-4H are a diagrammatic sequence of figures to illustrate the manufacturing method that is carried out with the setup device according to various embodiments.

According to FIG. 4A, a transfer position of the device is assumed in that the actuators 4 are extended in the direction of the arrow. This results in a curved supporting surface 8 which corresponds to the target position, in which supporting surface 8 the flexible intermediate elements 7 arranged between the individual form channels 6 are tensioned.

Figure 4B:
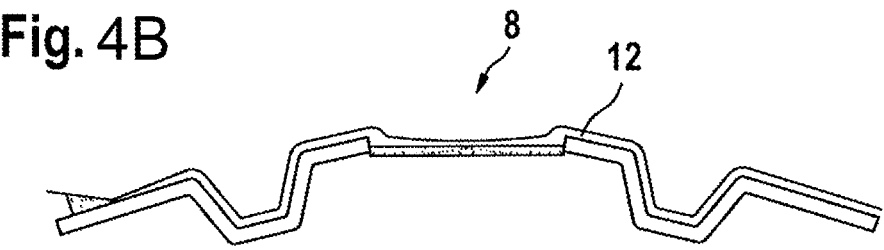

According to FIG. 4B, the form surface 8 is subsequently overlaid with a vacuum film or foil 12 in order to seal the aforesaid.

Figure 4C:
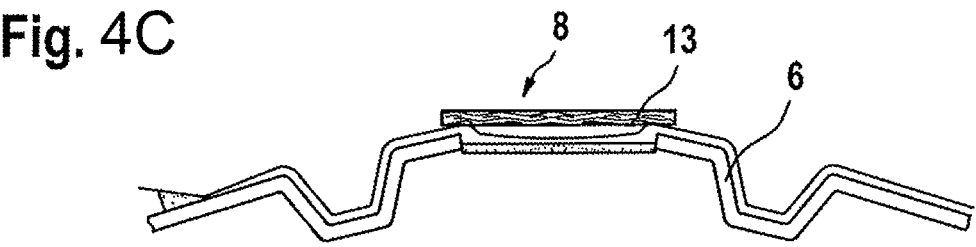

According to FIG. 4C, the supporting surface 8 is subsequently overlaid with prefabricated auxiliary-material webs 13 in the region between adjacent form channels 6

Figure 4D:
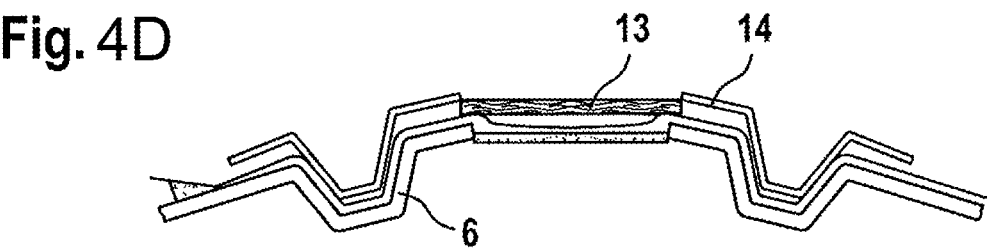

According to FIG. 4D, respectively associated stringers 14 comprising a carbon-fiber-reinforced plastic are put into place in the form channels 6 in such a manner that, depending on the design and manufacturing method, at the edge they overlap partly or fully or not at all with the auxiliary-material webs 13.

Figure 4E:
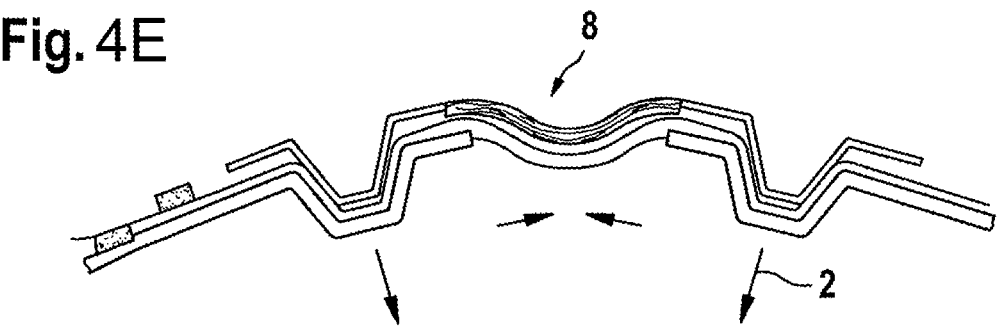

According to FIG. 4E, the actuators 2 are subsequently retracted so that the flexible intermediate elements 7 also relax in order to move the supporting surface 8 to a retracted position.

Figure 4F:
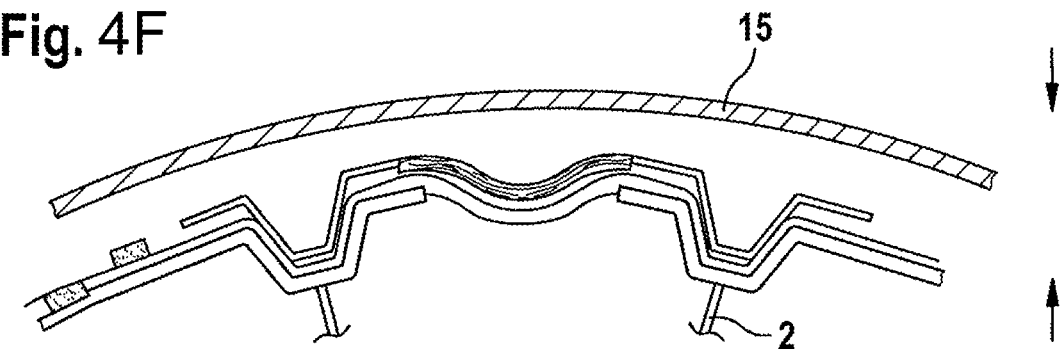

According to FIG. 4F, the setup device that is completely overlaid with a skin and any pressure plates or auxiliary materials that may be required, in this retracted position is on the face fed to the associated laminating-bonding device 15 by way of retraction.

Figure 4G:
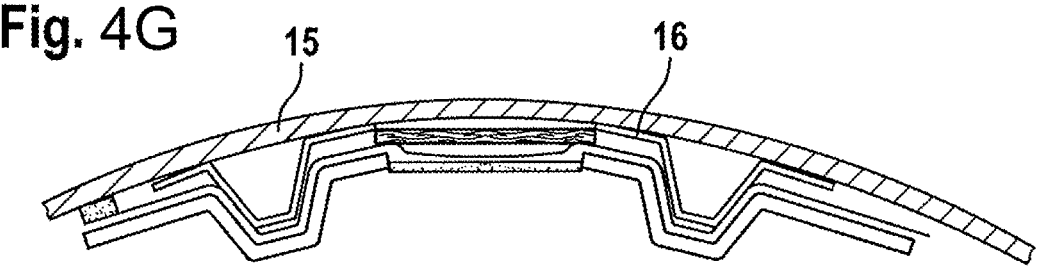

According to FIG. 4G, the actuators 4 are subsequently again extended to a transfer position in order to cause pressing of the overlaid form surface 8 and thus of the stringers against a correspondingly formed counter surface of the laminating-bonding device 15. After evacuation on the side of the supporting surface 8 has been relaxed, evacuation on the opposite counter surface on the side of the laminating-bonding device 15 takes place. As a result of this the fuselage barrel 16 to be formed by stringers and the auxiliary materials is pressed against the laminating-bonding device LKV by the atmospheric pressure and is thus transferred to the laminating-bonding device 15.

Figure 4H:
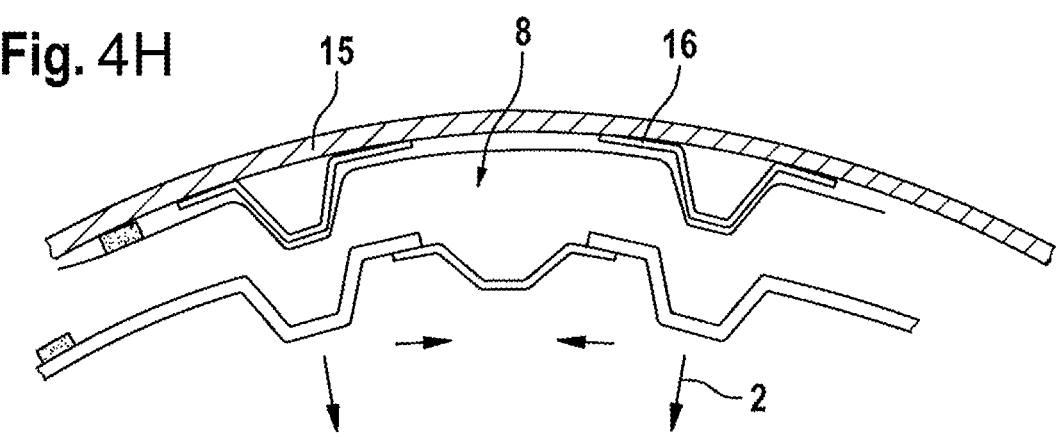

In an exemplary last method-related step, illustrated in FIG. 4H, the actuators 2 are retracted in order to move the setup device to the retracted position so that the aforesaid can subsequently again be moved out of the laminating-bonding device 15.

The present disclosure is not limited to the two above-described exemplary embodiments of the setup device for manufacturing a fuselage barrel for an aircraft. Instead, modifications of this are also imaginable, which modifications are within the scope of protection of the following claims. For example, it is also possible to use electromotor-driven linear motors or hydraulic cylinders instead of pneumatic actuators. Likewise, the retracted position can also be caused by other intermediate elements that can alter the supporting surface.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A setup device for manufacturing a fiber-composite fuselage barrel for an aircraft comprising:
   a first support structure having an interior volume defining a cylindrical wall;
   a second support structure movable between a retracted position outside the interior volume and an extended position within the interior volume, the second support structure having at least two form channels interconnected along a longitudinal edge by a flexible intermediate element to form a cylindrical support that is closed in a vacuum-tight manner, and at least one actuator for radially positioning at least one of the form channels such that the cylindrical support is adjustable in a radial direction relative to the cylindrical wall;
   wherein the second support structure is configured to support a plurality of stringers arranged so as to be spaced apart from each other, each of the stringers including a base structure to form a load-bearing rigid substructure that is connected to an outwardly curved supporting surface for the positive setup of the fuselage barrel between the cylindrical support and the cylindrical wall;
   wherein the at least one actuator is a pressure-means cylinder that positions the at least one form channel in the radial direction for adjusting the cylindrical support in the radial direction relative to the cylindrical wall; and
   wherein the flexible intermediate element is an elastic band.

2. The setup device of claim 1, wherein several of the plurality of rigidly interconnected form channels are adjustable by way of a shared one of the actuators.

3. The setup device of claim 1, wherein each of the plurality of form channels comprises grooves for guiding a vacuum and comprises vacuum connections for the supporting surface.

4. The setup device of claim 1, wherein a groove region of each of the plurality of form channels comprises several positioning sections that are arranged so as to be spaced apart from each other, that reduce the groove region cross section, and that correspond to the target geometry of a respective one of the stringers to be placed in the groove region.

5. The setup device of claim 1, wherein a face end of the second support structure is installed on a travelling trolley for retraction and extension into the interior volume of the first support structure.

6. A setup device for manufacturing a fiber-composite fuselage barrel for an aircraft comprising:
   a first support structure having an interior volume defining a cylindrical wall;
   a second support structure movable between a retracted position outside the interior volume and an extended position within the interior volume, the second support structure having a plurality of form channels, each form channel interconnected to an adjacent form channel along longitudinal edge by a flexible intermediate element to form a cylindrical support that is closed in a vacuum-tight manner, and a plurality of actuators, each actuator configured to position at least one of the form channel such that the cylindrical support is adjustable in a radial direction relative to the cylindrical wall;

wherein the second support structure is configured to support a plurality of stringers arranged so as to be spaced apart from each other, each of the stringers including a base structure to form a load-bearing rigid substructure that is connected to an outwardly curved supporting surface for the positive setup of the fuselage barrel between the cylindrical support and the cylindrical wall;

wherein the actuators are pressure-means cylinders that position the at least one form channel in the radial direction for adjusting the cylindrical support in the radial direction relative to the cylindrical wall; and wherein each of the plurality of form channels comprises grooves for guiding a vacuum and comprises vacuum connections for the supporting surface.

7. The setup device of claim 6, wherein several of the plurality of rigidly interconnected form channels are adjustable by way of a shared one of the actuators.

8. The setup device of claim 6, wherein a groove region of each of the plurality of form channels comprises several positioning sections that are arranged so as to be spaced apart from each other, that reduce the groove region cross section, and that correspond to the target geometry of a respective one of the stringers to be placed in the groove region.

9. The setup device of claim 6, wherein a face end of the second support structure is installed on a travelling trolley for retraction and extension into the interior volume of the first support structure.

* * * * *